Aug. 7, 1962
S. R. JORDAN
3,048,771
REGULATOR
Filed April 25, 1957
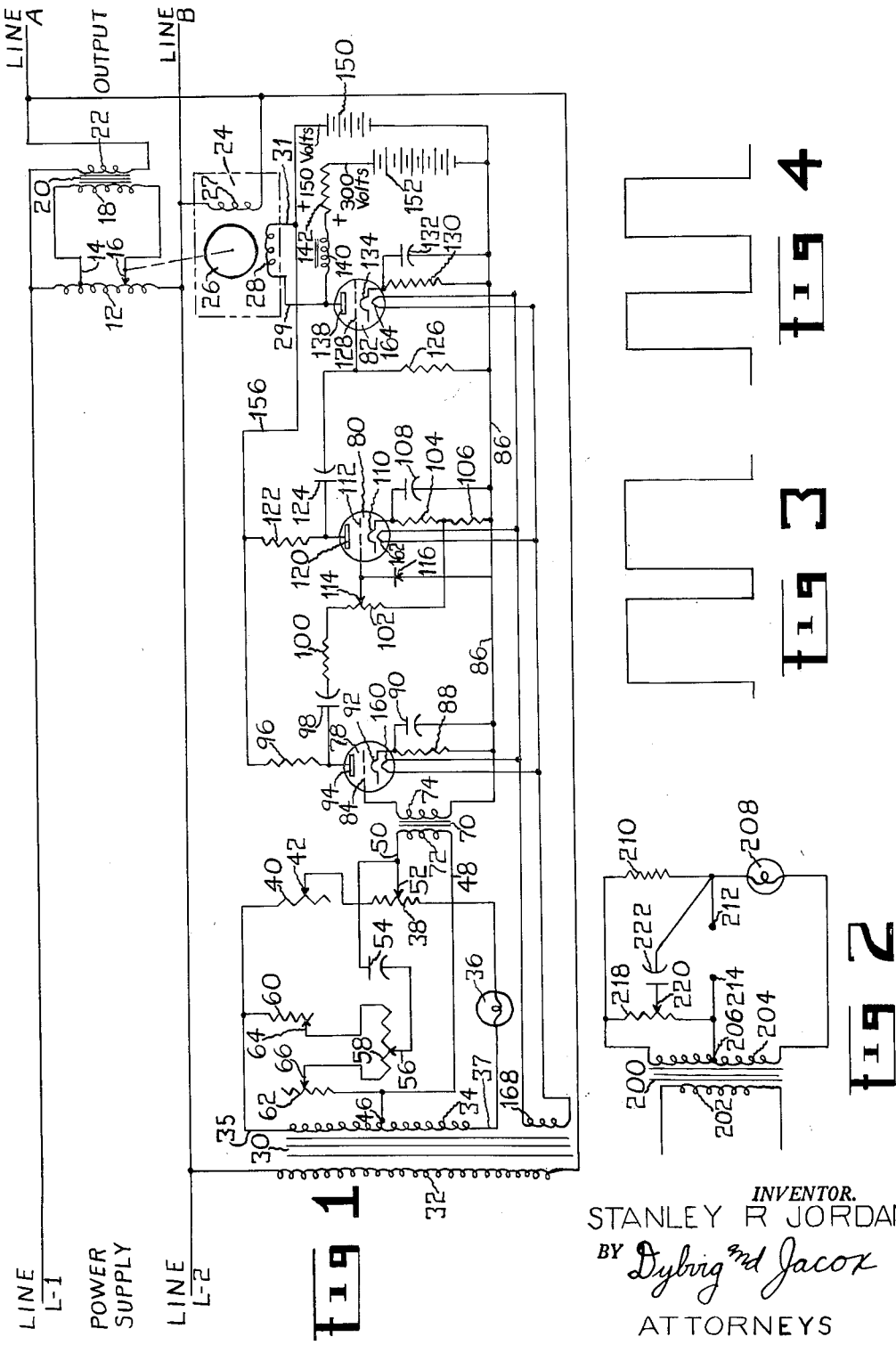
INVENTOR.
STANLEY R JORDAN
BY Dybvig and Jacox
ATTORNEYS United States Patent Office 3,048,771
Patented Aug. 7, 1962

3,048,771
REGULATOR
Stanley R. Jordan, Dayton, Ohio, assignor to Standard Electrical Products Company, a corporation of Ohio
Filed Apr. 25, 1957, Ser. No. 696,009
5 Claims. (Cl. 323—75)

This invention relates to a regulator. The invention relates more particularlry to a voltage regulator.

An object of this invention is to provide a voltage regulator which has a high degree of accuracy.

Another object of this invention is to provide a voltage regulator having a high rate of response.

Another object of this invention is to provide a voltage regulator which may be constructed at a low cost.

Another object of this invention is to provide a voltage regulator which has a minimum number of component parts and which may be constructed in a small physical size.

Another object of this invention is to provide voltage sensitive means having "thermal lag" compensation means.

Another object of this invention is to provide amplifier means producing a symmetrically shaped output wave even when the control means is overdriven.

Another object of this invention is to provide means for electrically braking an alternating current motor.

Other objects and advantages reside in the construction of parts, the combination thereof, the method of manufacture, and the mode of operation, as will become more apparent from the following description.

In the drawings:

FIGURE 1 is a schematic wiring diagram of a voltage regulator of this invention.

FIGURE 2 is a wiring diagram of a preferred modification of a voltage sensing circuit of a voltage regulator of this invention.

FIGURE 3 is a diagram showing an output wave shape obtainable with a conventional type of amplifier applied to voltage regulator use.

FIGURE 4 is a diagram showing an output wave shape obtainable in the voltage regulator of this invention.

Referring to the drawings in detail, a voltage regulator of this invention includes an adjustable voltage transformer which may be of the auto-transformer type having a winding 12, as shown in FIGURE 1. The winding 12 is connected to any suitable source of electrical energy by means of power supply lines L–1 and L–2.

The winding 12 has a permanent tap 14 and an adjustable tap 16. The tap 14 connects to one end of a primary winding 18 of a regulating transformer 20. The adjustable tap 16 connects to the other end of the primary winding 18. The regulating transformer 20 has a secondary winding 22, one end of which is connected to the power supply line L–1; the other end of the winding 22 is connected to an output line, herein referred to as output line A. An output line B connects to the power supply line L–2.

Thus, it is understood that when the winding 12 is energized, adjustment of the tap 16 along the winding 12 changes the voltage across the primary winding 18 of the regulating transformer 20. Thus, the voltage across the secondary winding 22 is changed. The winding 22 acts as a "buck" or "boost" winding, the voltage across the output lines A and B being equal to the voltage across the winding 12 plus or minus the voltage across the winding 22. The amount of "buck" or "boost" voltage supplied by the secondary winding 22 is determined by the position of the adjustable tap 16 of the winding 12. When the adjustable tap 16 is on one side of the permanent tap 14, the voltage across the secondary winding 22 is a "boost" voltage; when the adjustable tap 16 is on the other side of the permanent tap 14, the voltage of the secondary winding 22 is a "buck" voltage.

A motor 24 has a rotor 26 thereof connected to the adjustable tap 16 of the winding 12 for adjustment thereof, as shown diagrammatically in FIGURE 1. The motor 24 has a stator winding 27 and a stator winding 28, the stator windings 27 and 28 being electrically displaced one with respect to the other in a conventional manner. The stator winding 28 has connection leads 29 and 31, as shown. The stator winding 27 is connected across the output lines A and B.

A control transformer 30 has a primary winding 32 connected across the output lines A and B. The control transformer 30 has a secondary winding 34 provided with a lead 35 at one end thereof and a lead 37 at the other end thereof.

The control transformer 30 supplies energy directly to a voltage sensitive bridge which includes a metallic filament lamp 36 which is connected to the connection lead 37 of the secondary winding 34. The metallic filament lamp 36 is connected in series with a resistor 38. The resistor 38 connects to an adjustable resistor 40 having a slide tap 42. The resistor 40 connects to the lead 35 of the secondary winding 34. The secondary winding 34 of the transformer 30 has a permanent tap, preferably a mid-tap referred to herein by numeral 46.

Connected to the tap 46 is a bridge output line 48. A bridge output line 50 is connected to a movable tap 52 which electrically contacts the resistor 38. Also connected to the movable tap 52 is a condenser 54. The condenser 54 is electrically attached by means of a slide tap 56 to a resistor 58. The resistor 58 is in series with portions of resistors 60 and 62 by means of slide taps 64 and 66 respectively. The series of resistors 62, 58, and 60 are connected from the tap 46 to the connection lead 35 of the secondary winding 34, as shown in FIGURE 1.

The bridge output lines 48 and 50 connect to an intermediate transformer 70 having a primary winding 72 and a secondary winding 74. The secondary winding 74 of the transformer 70 connects to an amplifier section of the voltage regulator of this invention. The amplifier section includes a plurality of electron discharge devices or electronic tubes, herein referred to by numerals 78, 80, and 82.

One end of the secondary winding 74 connects to a grid 84 of the electronic tube 78. The other end of the secondary winding 74 is attached to a common conductor 86. Attached to the common conductor 86 is a resistor 88 and a capacitor 90, in parallel therewith. The resistor 88 and the capacitor 90 connect to a cathode 92 of the electronic tube 78. An anode 94 of the electronic tube 78 connects to a resistor 96. The anode 94 also connects to a capacitor 98 which is in series with a resistor 100 and a resistor 102. The resistor 102 connects to the juncture between a resistor 104 and a resistor 106. The resistors 104 and 106 are in series relation and are in parallel with a capacitor 108.

The combination of the resistors 104 and 106 with the capacitor 108 are connected between the conductor 86 and a cathode 110 of the electronic tube 80. A grid 112 of the electronic tube 80 connects to the resistor 102 by means of a slide tap 114. Connected between the tap 114 and the common conductor 86 is a diode rectifier 116.

An anode 120 of the electronic tube 80 connects to a resistor 122 and also connects to a capacitor 124. The capacitor 124 is in series with a resistor 126 which connects to the common conductor 86.

A grid 128 of the electronic tube 82 is electrically attached to a point between the capacitor 124 and the resistor 126. A resistor 130 and a capacitor 132 in parallel therewith are electrically connected between a cathode 134 of the electronic tube 82 and the common conductor 86.

The electronic tube 82 is provided with an anode 138 to which is connected a choke 140. In series with the choke 140 is a resistor 142. The resistor 142 connects to a direct current positive potential, herein shown as a battery 152 having a positive potential of 300 volts. The anode 138 also connects to the connector lead 29 of the motor stator winding 28. The other end of the motor winding, connector lead 31, is attached to a source of positive direct current potential, herein shown as a battery 150 having a positive potential of 150 volts. The battery 150 also connects to the resistors 96 and 122 to provide positive potential to the anodes 94 and 120 by means of a conductor 156. The other end, or negative end, of the batteries 150 and 152 connects to the common conductor 86 to provide a circuit from the anodes of the tubes 78, 80 and 82 to the cathodes thereof.

It is to be understood that the positive direct current potentials, herein shown as 300 volts and 150 volts, may be of any suitable values and may be provided by any suitable means.

The electronic tubes 78, 80, and 82 are provided with conventional heaters 160, 162, and 164 respectively which are energized by means of a secondary winding 168 of the transformer 30.

*Operation*

Suitable switch means (not shown) may be attached to power supply lines L-1 and L-2 to control energization of the winding 12, thus controlling energization of the other elements of the assembly. When the winding 12 is energized, the regulating transformer 20 is energized through the tap members 14 and 16. As stated above, the voltage of the secondary winding 22 adds or subtracts from the voltage across the power supply lines L-1 and L-2. The winding 27 of the motor 24 is connected across the output lines A and B and is therefore energized in accordance with the output voltage across the output lines A and B.

The control transformer 30 has the primary winding 32 thereof connected across the output lines A and B. The secondary winding 34 of the transformer 30 has connected thereto the voltage sensitive bridge which includes the lamp 36. It is known that the resistance of a metallic filament lamp such as the lamp 36 varies with the voltage applied thereto and thus such a lamp may be used in a voltage sensitive bridge circuit. In such a lamp, the resistance increases as the voltage applied thereto increases. The resistance increase with increase in voltage is a result of the higher filament temperature at the increased power. Due to the fact that there is time involved in the heating of the filament of the lamp the temperature and resistance peak of the lamp fellows or "lags" the peak of the applied voltage. This characteristic of the filament is referred to herein as "thermal lag." Thus, in a conventional bridge circuit using a metallic filament lamp, the voltage across the lamp lags the supply voltage. Therefore, in a conventional bridge circuit using a metallic filament lamp there is a lag in the voltage across the lamp with respect to the input voltage to the bridge.

In this invention means are provided to cause voltage across the bridge arm from the connection lead 37 of the winding 34 to the tap 52 to be in phase with the voltage across the arm from the tap 52 to the connection lead 35. Naturally, the voltages across each portion of the transformer winding 34 are in phase one with the other. Therefore, at a given voltage and with a proper adjustment of the components of the bridge, it is possible to obtain a balance of the bridge currents with the exception of possible harmonic currents. The resistance elements 60, 62, and 58 are connected from the tap 46 of the transformer winding 34 to the upper end of the winding 34. Thus, the resistance elements 60, 58, and 62 are connected across a portion of the transformer winding 34. The tap 56 of the resistor 58 connects to the bridge output lead 50 through the capacitor 54. Thus, the resistance elements 60, 58, and 62 with the capacitor 54 comprise a potentiometer-capacitor network which causes the voltage across the arm of the bridge from the tap 52 to the upper end of the transformer winding 34 to lag its current so that the voltage across this arm may be in phase with the voltage across the arm in which the lamp is connected.

The adjustment taps 64, 56, and 66 of the resistors 60, 58, and 62 provide fine and coarse adjustment means of the compensation. Experience shows that the bridge circuit requires a slightly different adjustment of the resistance of the potentiometer-capacitor network with each adjustment of the movable tap 52. The movable tap 52 serves as the voltage setting adjustment tap of the regulator. Movement of the adjustment tap 52 along the resistance 38 changes the voltage at which the bridge is balanced. The secondary winding 74 of the transformer 70 connects to the first stage of the amplifier section of the voltage regulator, including the tube 78.

The amplifier section is adapted to amplify, without excessive distortion, the output of the voltage sensitive bridge. The output of the amplifier section provides sufficient power to properly energize the winding 28 of the motor 24.

The control element or grid 112 of the tube 80 is connected to means which causes an efficient symmetrical output wave shape even when large deviations in the input supply voltage suddenly occur. The control element or grid 112 of a conventional amplifier tube, such as the tube 80, is normally non-conducting. However, when overdriven by large deviations in grid voltage, during the positive peaks the grid attracts electrons from the cathode and if the grid leak resistor is not of sufficiently low resistance, negative charges accumulate on the grid. This results in excessive, unsymmetrical distortion of the voltage output signal of the tube. FIGURE 3 in the drawings shows the unsymmetrical distorted wave shape output of a conventional overdriven capacitor coupled amplifier. This unsymmetrical wave shape contains largely even harmonics at the expense of the fundamental frequency. Since only the fundamental frequency produces torque in a motor with the flux of the fundamental frequency, this unsymmetrical wave shape shown in FIGURE 3 is inefficient. Such a wave shape might be produced by the tube 80 if means were not provided to change such a wave shape to a more efficient type of wave shape.

The resistor 102 serves as a grid leak resistor for the tube 80. The grid leak resistor 102 is connected to the junction of the cathode resistors 104 and 106. The diode rectifier 116 is connected to the grid 112 of the tube 80 in such a sense that the grid 112 can rapidly discharge excessive negative charges. Thus, the diode rectifier 116, in cooperation with the grid leak resistors 102 and 106 provides means for an output voltage of tube 80 which appears similar to that shown in FIGURE 4 of the drawings. The voltage wave shown in FIGURE 4 is symmetrical and more efficient than that shown in FIGURE 3 which would be produced without the diode 116.

The capacitor 108 is a conventional by-pass capacitor commonly used across the cathode resistor of an amplifier stage to prevent loss of gain caused by degenerative signal voltage appearing across the cathode resistors 104 and 106.

The electronic tube 82 is coupled to the tube 80 by means of the capacitor 124. The tube 82 is part of the last stage of amplification of the signal from the voltage sensitive bridge. The output of the tube 82 flows to the winding 28 of the motor 24, as shown in FIGURE 1.

When the voltage across the output lines A and B is at the desired value in accordance with the adjustment of the tap 52 along the resistor 38, there is no voltage produced across the output lines 48 and 50 of the voltage sensitive bridge. Herein, this desired output voltage across lines A and B is referred to as nominal output voltage.

As shown, when the bridge is properly compensated as discussed above, the voltage output across the bridge output lines 48 and 50 is in phase with the voltage across the winding 34 and is of a given polarity when the output voltage across lines A and B is higher than the nominal output voltage. Also, when the output voltage across lines A and B is lower than the nominal output voltage, a voltage is produced across the bridge output lines 48 and 50. This voltage across the bridge output lines 48 and 50 is in phase with the voltage across the winding 34 but is of opposite polarity from the given polarity referred to above. Therefore, when the power supply voltage across lines L–1 and L–2 is such as to produce the desired output voltage across lines A and B as established by the adjustable tap 52, no output signal is produced by the amplifier section of the regulator.

When this output voltage across lines A and B is at the adjusted value, a direct current by means of the direct current supply sources 150 and 152 flows through the winding 28 of the motor 24. Herein the direct current supply 152 is shown as having a positive potential of 300 volts and the direct current supply 150 is shown as having a potential of 150 volts. The direct current through the winding 128 flows from one direct current supply to the other direct current supply. Thus, direct current may be said to flow from the 300 volt positive potential through the resistor 142, through the choke 140, through the connection lead 29, through the winding 28, through the connection lead 31 to the positive potential of 150 volts. If the rotor is rotating for correction of the voltage output, and the nominal voltage is reached, this direct current immediately flows through the winding 28, rapidly braking the rotor 26.

If, after the regulator is adjusted to provide a given output voltage across lines A and B, the input supply voltage should, for some reason, drop, the voltage sensitive bridge causes a potential to be produced across the output lines 48 and 50. This voltage across output lines 48 and 50 causes energization of the winding 74 of the intermediate transformer 70. The current produced in the winding 74 is amplified by the tubes 78, 80, and 82. The tube 82 is operating in class A–B. Therefore, the plate current of tube 82 increases when an alternating current signal is applied to the grid 128 thereof. When the plate current of the tube 82 increases, the potential at the connection lead 29 decreases.

By proper selection of the value of the resistor 142, this voltage at the connection lead 29 is lowered to about 150 volts when the tube 82 is providing an alternating or varying signal. This is due to the fact that when a signal is applied to the grid 128 and the tube 82 conducts accordingly, the voltage of the plate 138 is lowered toward the voltage of the cathode 134. Thus, the direct current potentials of the leads 29 and 31 of the stator winding 28 become equal or substantially equal. Therefore, no direct current or very little direct current flows through the winding 28. The choke 140 blocks most of the alternating or varying current produced by the tube 82 from flowing therethrough. Thus, all or nearly all of the signal current flowing through the tube 82 flows through the connection lead 29, through the stator winding 28, and through the connection lead 31.

Thus, a controlled alternating current flows through the stator winding 28 when the tube 82 conducts current. Thus, due to the fact that the regulator is correcting for a drop in output voltage, the rotor 26 of the motor 24 is caused to rotate in a direction so that the slide tap 16 of the winding 12 moves away from the permanent tap 14 to cause an increase in the voltage across the winding 18. This voltage across the winding 18 is of such a polarity to cause an increase in the output voltage across lines A and B. The amplifier tube 82 provides a signal, causing the rotor 26 to rotate until the slide tap 16 has moved sufficiently to bring the output voltage across output lines A and B to the proper value to again cause balancing of the voltage sensitive bridge supplied by the transformer 30.

Naturally, when the voltage across the winding 34 of the transformer 30 has again been brought to the proper potential the bridge output lines 48 and 50 have no voltage produced therebetween and the tube 82 provides no output signal and the direct current potential of the connection lead 29 rises. Thus, direct current is again permitted to flow through the stator winding 28 from the potential sources 150 and 152. This direct current again causes braking of the rotor 26 so that the adjustable tap 16 is maintained at the proper adjusted position to cause the desired output voltage across output lines A and B.

If, after output voltage across output lines A and B is at the desired value, the input voltage across lines L–1 and L–2 should rise, a voltage is produced across the bridge output lines 48 and 50. The polarity of this voltage is such that the tubes 78, 80, and 82 cause an alternating current to flow through the stator winding 28 for operating the rotor 26 in the direction to cause the tap 16 to move closer to the tap 14 of the winding 12. Thus, the rotor 26 is caused to rotate in the opposite direction so that the slide tap 16 moves toward the permanent tap 14. Thus, the voltage across the winding 18 is reduced. Thus, the slide tap 16 coincides with the permanent tap 14. If further correction should be required, the slide tap 16 moves from the permanent tap 14 in the opposite direction, causing the polarity of winding 18 to reverse. This results in a "bucking" action across the winding 22, reducing the voltage across output lines A and B below the voltage across power supply lines L–1 and L–2.

Thus, it may be readily understood that the voltage regulator of this invention provides means for rapidly and accurately maintaining a desired output voltage.

FIGURE 2 in the drawings shows a preferred modification of a voltage sensitive bridge circuit provided with a metallic filament lamp and having means for compensating for the thermal lag of the metallic filament lamp. In FIGURE 2 a transformer 200 has a primary winding 202 and a secondary winding 204 supplying energy to the bridge circuit. The secondary winding 204 has a permanent tap, preferably a mid-tap 206. A metallic filament lamp 208 is in one arm of the bridge and a resistor 210 is in the other arm of the bridge.

Connected from the juncture between the lamp 208 and the resistor 210 is an output terminal 212. Connected to the tap 206 of the transformer winding 204 is an output terminal 214. Connected across the transformer winding 204 from the tap 206 thereof to the upper end of the resistor 210 is a resistor 218 provided with an adjustment tap 220 electrically movable along the resistor 218. Connected from the juncture of the lamp 208 and the resistor 218 to a slide tap 220 is a capacitor 222.

Thus, it is understood that the capacitor network of FIGURE 2 causes a lagging voltage in the arm of the bridge in which the resistor 210 is connected. This lagging voltage in this upper arm of the bridge compensates for the lagging voltage in the arm of the bridge in which the lamp 208 is connected. By proper selection and adjustment of the components of the resistance-capacitor network, there is complete compensation for the lagging resistance of the filament of the lamp 208. Thus, the voltage across the lamp 208 is in phase with the voltage across the resistor 210.

It is to be understood that within the purview of this invention other suitable types of amplifier circuits may be employed. Also, within the purview of this invention other basic types of components may be employed to perform the same or similar functions produced by the components of the assembly of this invention as set forth herein.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

I claim:

1. A voltage sensitive bridge comprising an input transformer having a primary winding and a secondary winding a metallic filament lamp connected in series with one end of the secondary winding, a first resistor connected in series with the lamp, the first resistor having an adjustment finger electrically movable along the resistor, an adjustable resistor connected in series with the first resistor, an adjustable resistor also being connected to the end of the secondary winding opposite the lamp, the secondary winding of the transformer also having a tap electrically connected thereto intermediate the ends thereof, a first output lead, the first output lead being connected to the tap of the secondary winding, a resistor connected between the tap of the secondary winding and the said end of the secondary winding opposite the lamp, an adjustable tap electrically connected to the last said resistor, a condenser connected to the tap and to the adjustment finger of the first resistor, a second output lead, the second output lead being connected to the adjustment finger.

2. In an automatic voltage regulator, a transformer provided with a secondary winding, impedance elements connected to the winding forming a network having input and output lines, there being a first element and a second element, the first element of the network having the resistance thereof increase with the voltage thereacross, said first element having the voltage thereacross responsive to the temperature thereof, changes in current through said first element causing changes in the temperature thereof, a change in the current in said first element being followed by a time lag before the resulting change in temperature of said element occurs, adjustable voltage means connected across a portion of the winding and a capacitor connected to said adjustable voltage means and to said second element providing a voltage to the second element which compensates for the lag in temperature change of the first element with changes in current through the first element so that the voltage across the output lines can be adjusted to zero when a given voltage is applied to the input lines.

3. In voltage regulator circuitry, a transformer having a secondary winding provided with a tap between the ends of the winding and a terminal connector at each end of the secondary winding, there being a first terminal connector and a second terminal connector, a resistor connected to the first terminal connector and a metallic filament lamp connected to the second terminal connector, the lamp and the resistor also being connected one to the other so that the lamp and the resistor are connected in series across the secondary winding, impedance means connected from the tap to the first terminal connector, an adjustable connector movable along a portion of the impedance means, a capacitor connected from said adjustable connector to the juncture of the lamp and the resistor, the voltage thus applied to the resistor being compensated for the lag of the voltage across the lamp with respect to the voltage across the secondary winding.

4. In voltage regulating circuitry, a transformer having a secondary winding provided with a connection tap between the ends thereof, a first connector at one end of the winding, a second connector at the other end of the winding, a resistor having one end thereof connected to the first connector, a metallic filament lamp having one terminal connected to the second connector and the other terminal connected to the other end of the resistor so that the resistor and the lamp are in series across the secondary winding, an adjustment tap connected to said resistor, resistor means connected from said connection tap to said first connector, adjustment members connected to portions of the resistor means, capacitor means connecting one of said adjustment members to said adjustment tap of the resistor, and output lines connected to the tap of the winding and to the adjustment tap of the resistor.

5. In an automatic voltage regulator, a source of alternating current electrical energy provided with a winding having a first end terminal and a second end terminal, a first impedance element, the first impedance element being substantially a pure resistance, means connecting the first impedance element to the first end terminal, a second impedance element, the second impedance element being of the type having the resistance thereof responsive to the voltage applied thereto, means connecting the second impedance element to the second end terminal, and means connecting the first impedance element to the second impedance element to form a circuit, the winding also having a tap intermediate the ends thereof, a potentiometer connected from the tap to the first end terminal of the winding, a capacitor connected from the potentiometer to a position in the circuit between the first impedance means and the second impedance means, and output lines connected to said circuit between the impedance elements and to said tap of the winding.

References Cited in the file of this patent

UNITED STATES PATENTS

| | | |
|---|---|---|
| 2,366,577 | Thompson | Jan. 2, 1945 |
| 2,508,639 | Field | May 23, 1950 |
| 2,519,057 | Luck | Aug. 15, 1950 |
| 2,529,490 | Field | Nov. 14, 1950 |
| 2,552,013 | Orpin | May 8, 1951 |
| 2,619,630 | Stone | Nov. 25, 1952 |
| 2,734,172 | Appert | Feb. 7, 1956 |
| 2,747,158 | Le Bel | May 22, 1956 |
| 2,758,205 | Lubkin | Aug. 7, 1956 |
| 2,758,274 | Clark et al. | Aug. 7, 1956 |
| 2,798,953 | Fisher | July 9, 1957 |
| 2,816,263 | Sterk | Dec. 10, 1957 |